(12) United States Patent
Duval et al.

(10) Patent No.: US 7,576,034 B2
(45) Date of Patent: Aug. 18, 2009

(54) CROSSLINKED THREE-DIMENSIONAL POLYMER NETWORK, METHOD FOR PREPARING SAME, SUPPORT MATERIAL COMPRISING SAME AND USES THEREOF

(75) Inventors: Raphaël Duval, Deauville (FR); Hubert Leveque, Lillebonne (FR)

(73) Assignee: Eka Chemicals AB, Bohus (SE)

( * ) Notice: Subject to any disclaimer, the term of this patent is extended or adjusted under 35 U.S.C. 154(b) by 848 days.

(21) Appl. No.: 10/490,356

(22) PCT Filed: Sep. 23, 2002

(86) PCT No.: PCT/FR02/03238

§ 371 (c)(1),
(2), (4) Date: Mar. 22, 2004

(87) PCT Pub. No.: WO03/026793

PCT Pub. Date: Apr. 3, 2003

(65) Prior Publication Data

US 2004/0260081 A1 Dec. 23, 2004

(30) Foreign Application Priority Data

Sep. 21, 2001 (FR) .................................. 01 12208

(51) Int. Cl.
*B01J 20/282* (2006.01)
*B01J 20/281* (2006.01)
*B01D 15/08* (2006.01)

(52) U.S. Cl. ........................ 502/402; 502/401; 210/635; 210/656; 210/660; 210/730; 210/198.2

(58) Field of Classification Search ................. 502/401, 502/402; 210/635, 656, 660, 730, 198.2
See application file for complete search history.

(56) References Cited

U.S. PATENT DOCUMENTS

| 5,657,681 | A | 8/1997 | Henricson |
| 6,011,149 | A | 1/2000 | Francotte |
| 6,042,723 | A | 3/2000 | Duval et al. |
| 6,277,782 | B1 * | 8/2001 | Moller et al. ............... 502/402 |
| 6,342,592 | B1 | 1/2002 | Duval et al. |
| 6,346,616 | B1 * | 2/2002 | Duval ...................... 536/123.1 |
| 2001/0029282 | A1 | 10/2001 | Duval |

FOREIGN PATENT DOCUMENTS

| EP | 0147804 | 7/1985 |
| EP | 0656333 A1 | 6/1995 |
| EP | 0155637 B2 | 6/1996 |
| EP | 0656331 B1 | 3/1998 |
| EP | 0899272 A1 | 3/1999 |
| EP | 0985682 A1 | 3/2000 |
| EP | 0864586 B1 | 4/2002 |
| FR | 2760752 | 9/1998 |
| FR | 2784108 | 4/2000 |
| FR | 2784109 | 4/2000 |
| WO | WO 94/12275 | 6/1994 |
| WO | WO 96/27615 | 9/1996 |
| WO | WO 97/04011 | 2/1997 |

OTHER PUBLICATIONS

Martel et al., "Preparation and Sorption Properties of a beta-cyclodextrin-linked Chitosan Derivative", Journal of Polymer Science: Part A: Polymer Chemistry, vol. 39, 169-176 (2001).*
Martel et al, "Preparation and Sorption Properties of a B-Cyclodextrin-Linked Chitosan Derivative", Journal of Polymer Science, pp. 169-176 etc.
Chemical Reviews, 1998, vol. 98, No. 5, pp. 1745 and 1780.
International Search Report, completed Mar. 25, 2003.
Panico et al, "Nomenclature and Terminology in Organic Chemistry", 1993-1995, pp. 1-95.
Selegny, Eric, "Optically Active Polymers", Charged and Reactive Polymers, vol. 5, 1979, pp. 1-417.

* cited by examiner

*Primary Examiner*—Ling-Siu Choi
(74) *Attorney, Agent, or Firm*—David J. Serbin; Robert C. Morriss

(57) ABSTRACT

The invention concerns a crosslinked optically active three-dimensional polymer network, consisting of homochiral units of a first selector and of homochiral units of at least a second selector of different structure from the first selector, the homochiral units of the first selector comprising at least three polymerisable or crosslinkable functional groups and the homochiral units of the second selector comprising at least two polymerisable or crosslinkable functional groups, the homochiral groups being chemically mutually bound. The invention also concerns a method for making such a polymer network and its uses.

21 Claims, No Drawings

CROSSLINKED THREE-DIMENSIONAL POLYMER NETWORK, METHOD FOR PREPARING SAME, SUPPORT MATERIAL COMPRISING SAME AND USES THEREOF

The present invention relates to crosslinked three-dimensional polymer networks, to the method for preparing them, and also to optically active support materials containing said three-dimensional polymer networks.

The invention also relates to the use of these crosslinked three-dimensional polymer networks and also to the optically active supports for optically enriching chiral molecules, and more particularly for separating enantiomers by liquid, supercritical, gas or gas-liquid chromatography.

When they are used in a chromatographic process, the supports of the invention constitute homochiral stationary phases, or "CSPs", and the technique used is then called chiral or enantioselective chromatography.

Chiral or enantioselective chromatography has experienced a considerable expansion over the last twenty years, both for applications in terms of analysis, but also for the industrial preparation of homochiral pharmaceutical molecules.

In fact, since the thalidomide tragedy in the 1960s, the health authorities of industrialized countries have gradually imposed regulatory restraints on industrial companies in the field of pharmacy, which must now support their dossier for a marketing authorization for new medicinal products with compared pharmacological and toxicological data for each homochiral or enantiomer molecule present in the future medicinal product.

Among the various homochiral stationary phases, or CPSs, which have been the subject of industrial developments, in order to produce homochiral molecules by preparative chromatographic resolution, polymeric selectors based on cellulose homopolymer derivatives (EP 0 147 804) or based on polymers having an asymmetric carbon atom in the principal chain (EP 0 155 637 B2) have until now constituted the most widely used technology.

Other selectors have also been the subject of considerable developments on an industrial scale, such as optically active polymers crosslinked in a network and chemically attached to a support (PCT/SE 93/01050) or also crosslinked but not necessarily chemically attached to a support (FR 98/11376, FR 98/11377, U.S. Pat. No. 6,042,723, EP 0 899 272 A1, EP 0 864 586 A2, WO 96/27615, WO 97/04011).

Other selectors have also been described, in particular in U.S. Pat. No. 6,277,782 and patent applications EP 985 682 and EP 656 331. These selectors consist of a single type of homochiral units which are monomers or polymers crosslinked by means of a nonchiral crosslinking agent or of a chiral, but not optically active, crosslinking agent as described in U.S. Pat. No. 6,011,149.

A hydrogel of chitosan and 2,3-dialdehydo-β-cyclodextrin has also been described in Chemical Reviews, 1998, Vol. 98, No. 5, page 1780.

However, there exists a real need for new optically active supports capable of allowing the separation of molecules exhibiting diverse chemical structures and exhibiting abilities for enrichment and for separation of enantiomers which are greater than those known and described until now, this ability being measured by the chromatography selectivity factor $\alpha$.

After long and thorough research studies, the applicant company has found that these aims are achieved by using a crosslinked optically active three-dimensional polymer network according to the invention.

The invention therefore relates to a crosslinked optically active three-dimensional polymer network consisting of homochiral units of a first selector and of homochiral units of at least one second selector of a structure different from the first selector, the homochiral units of the first selector containing at least three polymerizable or crosslinkable functional groups and the homochiral units of the second selector containing at least two polymerizable or crosslinkable functional groups, the homochiral units being chemically linked to one another, with the exclusion of the crosslinked three-dimensional polymer networks obtained either by reductive amination of chitosan and 2,3-dialdehydo-β-cyclodextrin, or by reaction between chitosan and chlorotriazinyl-β-cyclodextrin, or by crosslinking of a polysaccharide and a protein, or by reductive amination of a first polysaccharide, in which the saccharide rings have been opened using an oxidizing agent so as to form aldehyde functions, with a second polysaccharide carrying at least two amine functions, said first and second polysaccharides being chosen from hyaluronic acid, dextran, dextran sulfate, keratan sulfate, heparin, heparin sulfate and alginic acid.

A "homochiral unit" represents a monomeric, oligomeric or polymeric compound which is homochiral.

The polymerizable or crosslinkable functional groups are in particular primary, secondary or tertiary hydroxyl groups, primary or secondary amine groups, sulfhydryl groups, ethylenic double bonds or aldehyde groups.

In the present application, the expression "homochiral units being linked to one another" is intended to mean the fact that the various homochiral units are linked to one another via bonds resulting from polymerization (homopolymerization or copolymerization) or from crosslinking. The polymerization is carried out by virtue of functional groups present on the homochiral units. The crosslinking, which allows the formation of a three-dimensional network, is carried out by virtue of said functional groups or, optionally, using a nonchiral crosslinking agent containing at least two polymerizable or crosslinkable functional groups. With polymerization, a linear chain is obtained, whereas with crosslinking, a three-dimensional assembly is obtained.

The oligomers or polymers are of natural origin (polysaccharides, proteins, DNA, etc.) or are obtained by homopolymerization of the same homochiral monomer. They may also be obtained by copolymerization of two homochiral monomers of different chemical structure. Optically active heteropolymers are then obtained.

The optically active heteropolymers or homopolymers consist of at least 11 homochiral units (Nomenclature et Terminologie en Chimie Organique [Nomenclature and Terminology in Organic Chemistry], Sep. 1996, Techniques de l'Ingénieur [Techniques for the Engineer], 249, rue de Crimée, 75019 Paris) and their related oligomers consist of 1 to 10 homochiral units which are identical for the homopolymers and homooligomers and different for the heteropolymers and heterooligomers.

By way of example, a β-cyclodextrin or cyclomaltoheptaose is a cyclic oligosaccharide (Chemical Reviews, 1998, Vol. 98, No. 5, p 1745) and therefore a homooligomer.

It is a chiral selector which is greatly used in the synthesis of chiral stationary phases for chromatography. It may be mono- and polyfunctional given that the cyclodextrin molecule contains 21 primary and secondary alcohol functions. As such, β-cyclodextrin has a perfectly defined optical rotation and is optically active.

In accordance with the invention, the homochiral units containing at least two or at least three polymerizable or crosslinkable functional groups are chosen from the group consisting in particular of (R,R)-dithiothreitol (DTT), tartaric acid or derivatives thereof, such as N,N'-diallyltartramide (DAT), di-tert-butylbenzoyldiallyltartramide (DBBDAT), diacetyldiallyltartramide (DADAT), cyclodextrin, in particular β-cyclodextrin, or derivatives thereof such as tetrakis-6-O-(4-allyloxyphenylcarbamate)tris-6-O-(3,5-dimethylphenylcarbamate)heptakis-2,3-O-di-(3,5-dimethylphenylcarbamate)-p-cyclodextrin (T(AOPC-DMPC)), cellulose or derivatives thereof such as cellulose [6-(4-allyloxyphenyl)urethane, tris-2,3,6-[3,5-dimethylphenyl)urethane] (L(AOPC-DMPC)), and chitosan or derivatives thereof.

The structural formulae of some of these homochiral units containing at least two or at least three polymerizable or crosslinkable functional groups are given below:

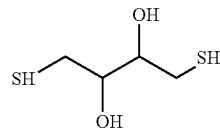

DDT: (-)-1,4-DITHIO-L-THREITOL or:
(2R, 3R)-1,4-dimercapto-2,3-butanediol

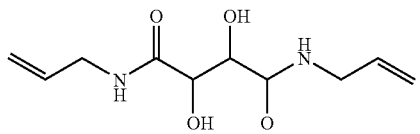

DAT: (-)-N,N'-DIALLYL-L-TARTRAMIDE

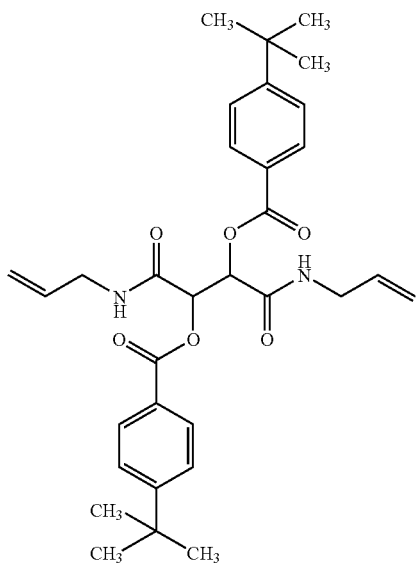

DBBDAT: (-)-O,O'-di-tertBUTYLBENZOYL-N,N'-DIALLYL-L-TARTRAMIDE

-continued

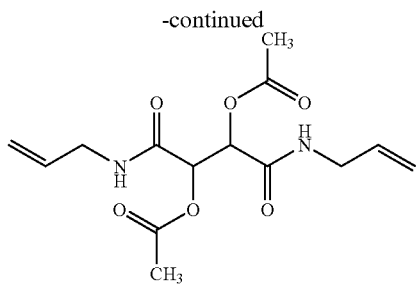

DADAT: (-)-O,O'-DIACETYL-N,N'-DIALLYL-L-TARTRAMIDE

According to another advantageous embodiment of the invention, the crosslinked optically active three-dimensional polymer network consists of homochiral units of a first selector and of homochiral units of a second selector of structure different from the first selector and of homochiral units of a third selector of structure different from the first and from the second selector, the homochiral units of the first selector containing at least three polymerizable or crosslinkable functional groups and the homochiral units of the second selector and also the homochiral units of the third selector containing at least two polymerizable or crosslinkable functional groups, the homochiral units being chemically linked to one another.

Of course, the number of homochiral selectors of different structures is not limited to three, it may be much higher.

According to another advantageous embodiment of the polymer network in accordance with the invention, attached to at least some of the homochiral units of a selector chosen from the group comprising the first selector, the second selector and, optionally, the third selector, is a nonchiral crosslinking agent containing at least two polymerizable or crosslinkable functional groups.

The crosslinking agent containing at least two polymerizable or crosslinkable functional groups is chosen from the group consisting in particular ethanedithiol, trithiocyanuric acid, 1,6-hexanedithiol, 1,2,6-hexanetrioltrithioglycolate and 2,5-dimercapto-1,3,4-thiadiazole.

According to another advantageous embodiment, in the polymer network in accordance with the invention, the homochiral units of at least one of the selectors are not β-cyclodextrin derivatives.

Thus, according to this particular embodiment, the polymer network may contain either units of a bifunctional derivative of β-cyclodextrin, i.e. a derivative of β-cyclodextrin in which at least 2 —OH groups have each been replaced with a polymerizable or crosslinkable functional group, or else units of a trifunctional derivative of β-cyclodextrin, i.e. a derivative of β-cyclodextrin which at least 3 —OH groups have each been replaced with a polymerizable or crosslinkable functional group. This polymer network does not therefore contain both units of a bifunctional derivative and units of a trifunctional derivative of β-cyclodextrin.

The invention also relates to a method for preparing the crosslinked optically active polymer network, which is characterized in that:

a) at least one first selector consisting of at least one homochiral unit containing at least three polymerizable or crosslinkable functional groups, at least one second selector consisting of at least one homochiral unit containing at least two polymerizable or crosslinkable functional groups and, optionally, at least one third selector consisting of at least one homochiral unit containing at least two polymerizable or crosslinkable functional groups are selected;

b) optionally, at least one nonchiral crosslinking agent containing at least two polymerizable or crosslinkable functional groups is selected;

c) optionally, at least some of the homochiral units of at least one selector chosen from the group comprising a first selector, a second selector and, optionally, a third selector are reacted with the nonchiral crosslinking agent;

d) either the homochiral units of the first selector are copolymerized with the homochiral units of the second selector and, optionally, with the homochiral units of the third selector;

e) or else at least some of the homochiral units containing at least three polymerizable or crosslinkable functional groups of the first selector are homopolymerized, and the homopolymerisates obtained are crosslinked with the homochiral units containing at least two polymerizable or crosslinkable functional groups of the second selector and, optionally, of the third selector, optionally in the presence of the remaining homochiral units of the first selector.

According to the particular embodiment including steps b) and c), in steps d) and e), use is made of at least some homochiral units of the first selector and/or of the second selector and/or, optionally, of the third selector to which the crosslinking agent is attached.

When it is desired to use a synthetic optically active polymer as one of the homochiral selectors, before carrying out the crosslinking operation with one or more other homochiral selectors, it is possible to use all the techniques described in the work by Eric Selegny entitled "Optically active polymers", integrated into the series of works "Charged and reactive polymers", volume 5, published in 1979 by D. Reidel Publishing Company, Dorrecht, Post Office Box 17, The Netherlands.

The invention also relates to an optically active support material, the optical activity properties of which are due to the fact that it consists in part of the polymer network described above.

The optically active support material in accordance with the invention consists of at least 0.1 to 100% of said optically active three-dimensional polymer network. The remainder up to 100% is generally in the form of silica gels, or of solid particles of mineral origin, such as silicon oxide, titanium oxide, aluminum oxide, clays, or of organic origin, such as polystyrenes, polyvinyl alcohols, etc.

The silica gels are the preferred supports when it is desired to use the final support material as CSP for enantioselective chromatography.

In accordance with the invention, the polymer network is either chemically linked to the mineral or organic support, or is physically deposited into the pores of the support, as described in the patents mentioned in the prior art. In the first case, the support undergoes prior chemical conversion making it possible to introduce functions capable of reacting and creating covalent bonds with the selectors of the polymer network.

The invention also relates to the use of an optically active support material containing the crosslinked three-dimensional polymer network described above, for removing from a mixture of at least two constituents, chosen from the group comprising organic, mineral or organomineral molecules, at least most of one of these constituents. It is in fact an operation of purification by simply bringing the various constituents into contact with the support materials containing the crosslinked three-dimensional polymer network, which trap impurities, for example, or which, on the contrary, preferentially retain the desired constituent. The support materials may also be used as a stationary phase for separating said constituents by a chromatographic method.

The chromatographic methods use a simple column or a multicolumn system according to the "simulated mobile bed" technique.

The invention also relates to the use of an optically active support material containing the crosslinked three-dimensional polymer network described above, for removing from a mixture of at least two enantiomers, chosen from the group comprising chiral organic molecules or chiral organomineral molecules, at least part of one of these constituents, so as to enrich the mixture in one of the optically active homochiral molecules and to thus obtain one of the enantiomers enriched. The method used may be simply bringing said optically active support material into contact with the mixture of enantiomers, one of the enantiomers being preferentially absorbed. The optical enrichment operation is carried out by filtration of the complex (optically active support material/absorbed enantiomer). The complex is then destroyed by bringing it into contact with a liquid which is a solvent for said enantiomer and which has the property of eliminating the specific interaction of said enantiomer with the optically active support material. The desorbed enantiomer is either not used since it is of no value and, in this case, it is the first filtrate which is optically enriched in the desired enantiomer, or it is used as optically enriched enantiomer.

The invention also relates to the use of an optically active support material as an enantioselective stationary phase for separating optically active molecules by a chromatographic method. This technique is also advantageous as a method for producing optically or enantiomerically pure or enriched homochiral molecules.

EXAMPLES

1—Synthesis of the Selector L(AOPC-DMPC)

(a) Preparation of allyloxyphenyl isocyanate (AOPC)

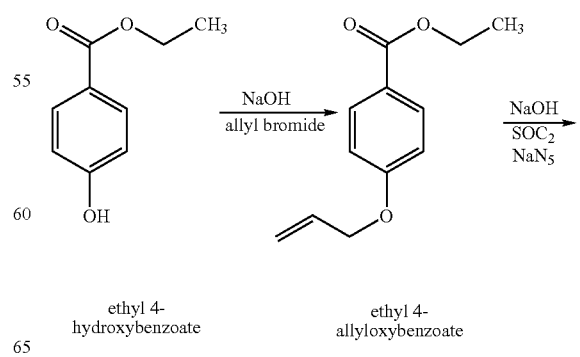

ethyl 4-hydroxybenzoate ethyl 4-allyloxybenzoate

-continued

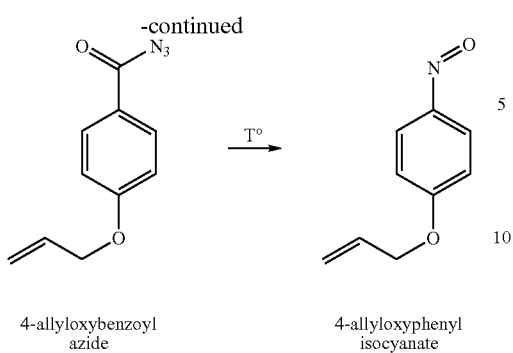

4-allyloxybenzoyl azide 4-allyloxyphenyl isocyanate

The preparation of 4-allyloxybenzoic acid, and of the corresponding isocyanate, via synthetic intermediates of the acid chloride and acyl azide type, is carried out according to the procedure described in Example 1 of patent application FR 97/03076 ("Preparation of parapent-4-enoxybenzoic acid), replacing the 5-bromo-1-pentene with allyl bromide.

b) Preparation of a cellulose
[6-(4-allyloxyphenyl)urethane, tris, 2,3,6[3,5-dimethyl-phenyl)urethane]

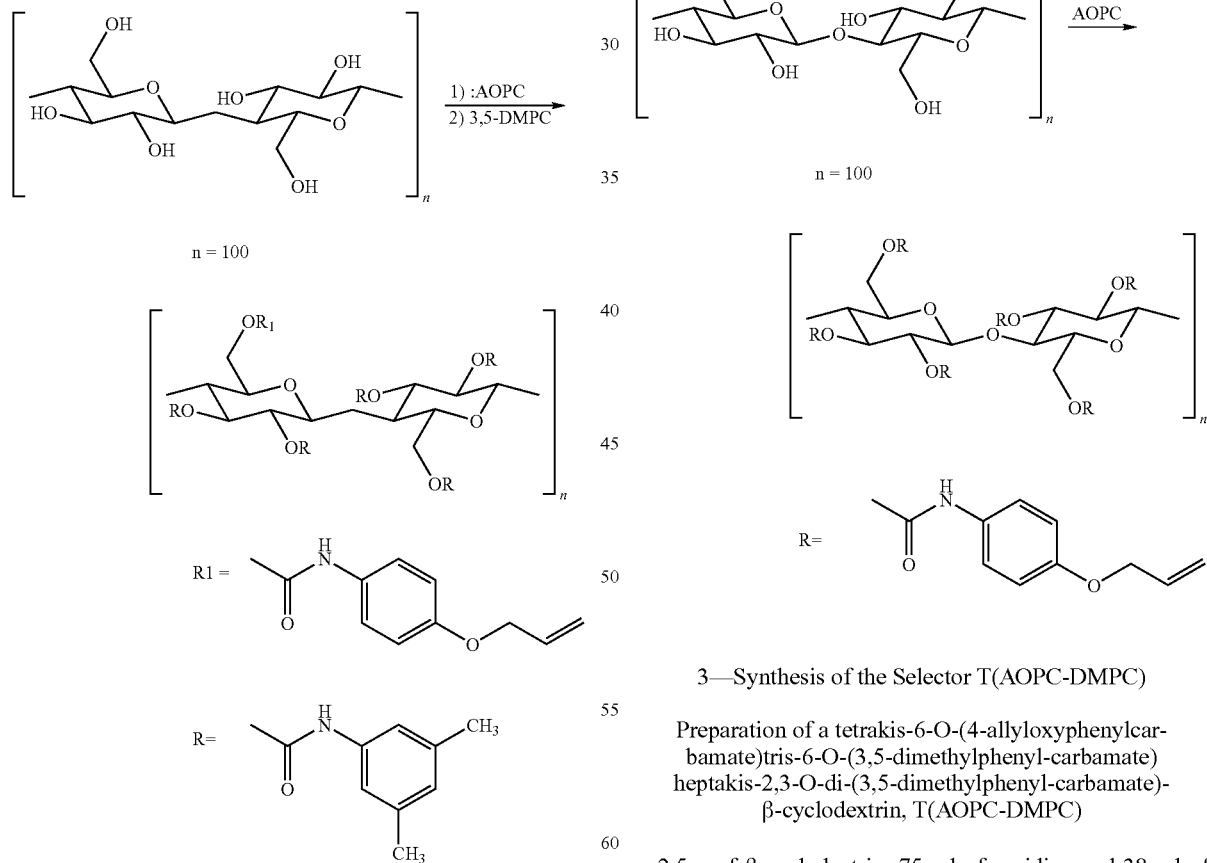

2.5 g of microcrystalline cellulose (average degree of polymerization n of 100), 75 ml of pyridine and 38 ml of heptane are placed in a reactor. Stirring and refluxing make it possible to dehydrate the cellulose by azeotropic entrainment. 1.35 g of 4-allyloxyphenyl isocyanate (AOPC), prepared in step (a) above, are added and the medium is brought to reflux for 24 hours in the presence of 0.05 g of 4-dimethylaminopyridine. 6.8 g of 3,5-dimethylphenyl isocyanate (3,5-DMPC) are added and the medium is again brought to reflux for 24 hours. The solution is cooled and then run into 100 ml of methanol. The precipitate is washed with 300 ml of methanol and then dried under vacuum at 50° C.

2—Synthesis of the Selector L(AOPC)

Preparation of a cellulose
[tris-2,3,6-(4-allyloxyphenyl)urethane]

2.5 g of microcrystalline cellulose (average degree of polymerization n of 100), 75 ml of pyridine and 38 ml of heptane are placed in a reactor. Stirring and refluxing make it possible to dehydrate the cellulose by azeotropic entrainment. 9.31 g of 4-allyloxyphenyl isocyanate (AOPC) are added and the medium is brought to reflux for 24 hours in the presence of 0.05 g of 4-dimethylaminopyridine. The solution is cooled and then run into 100 ml of methanol. The precipitate is washed with 300 ml of methanol and then dried under vacuum at 50° C.

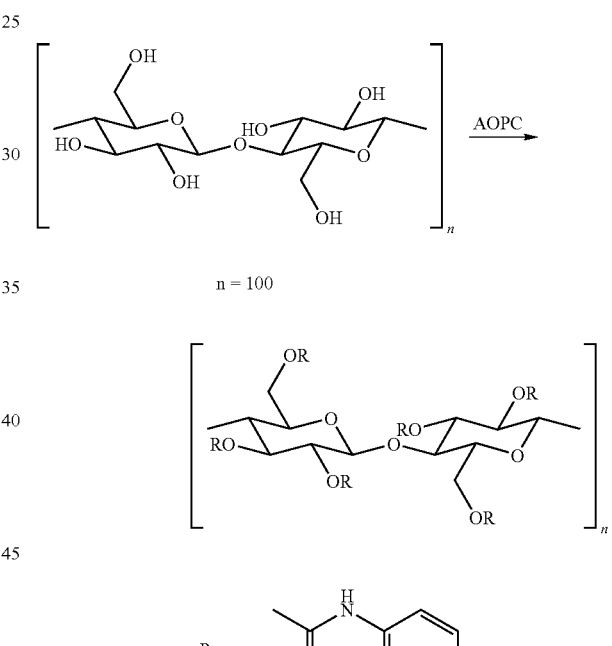

3—Synthesis of the Selector T(AOPC-DMPC)

Preparation of a tetrakis-6-O-(4-allyloxyphenylcarbamate)tris-6-O-(3,5-dimethylphenyl-carbamate) heptakis-2,3-O-di-(3,5-dimethylphenyl-carbamate)-β-cyclodextrin, T(AOPC-DMPC)

2.5 g of β-cyclodextrin, 75 ml of pyridine and 38 ml of heptane are placed in a reactor. Stirring and refluxing make it possible to dehydrate the cellulose by azeotropic entrainment. 1.35 g of 4-allyloxyphenyl isocyanate (AOPC) are added and the medium is brought to reflux for 24 hours in the presence of 0.05 g of 4-dimethylaminopyridine. 6.8 g of 3,5-dimethylphenyl isocyanate (3.5-DMPC) are added and the medium is again brought to reflux for 24 hours. The solution is cooled and then run into 100 ml of methanol. The precipitate is washed with 300 ml of methanol and then dried under vacuum at 50° C.

Scheme for synthesis of the selector T(AOPC-DMPC):

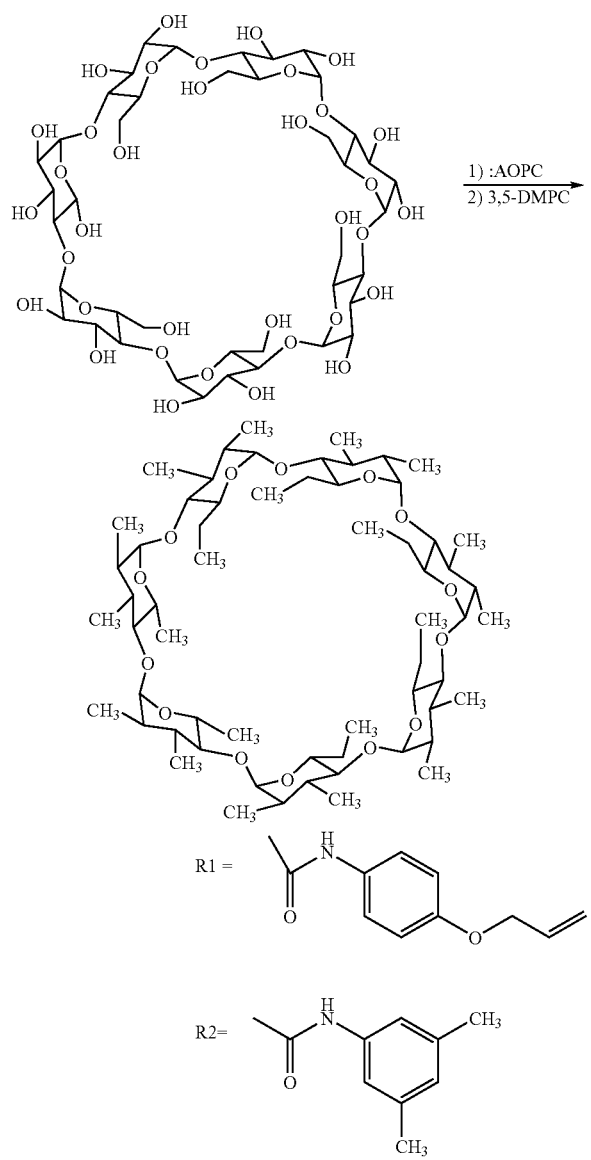

4—Synthesis of the Selector O,O'-di-tert-butylbenzoyl-L-diallyltartramide or DBBDAT The DBBDAT is Synthesized from Commercial (−)-N,N'-diallyltartramide 1 g of DAT is dissolved in 25 ml of methylene chloride. 1.72 g of tert-butylbenzoyl chloride are added with 1.2 ml of triethylamine, and the medium is kept at between 20 and 30° C. for 24 hours. The chloromethylenic phase is washed with 3 times 20 ml of water and is then evaporated to dryness. The solid is dried at 50° C. under vacuum.

A control for purity by elution in a 90/10 chloroform/methanol eluant on a thin layer chromatography plate (silica gel) indicates complete conversion of the starting material and the formation of a single product. The mass recovered is 2.47 g.

5—Synthesis of the CSP 9803/5601: Selector L(AOPC-DMPC) Crosslinked with DDT 0.82 g of selector from example 1 or L(AOPC-DMPC) are dissolved with 12 ml of tetrahydrofuran and 50 mg of (R,R)-1,4-dithiothreitol or DDT. 4 g of 1000 Å (pore diameter), 5 µm (particle diameter) silica are suspended in the above solution.

100 ml of heptane and 0.05 g of AIBN (azobisisobutyronitrile) are added slowly over 1 hour. The suspension is filtered after having been brought to reflux for 24 hours. The solid is washed with 100 ml of ethanol and then dried at 50° C. Dry weight: 4.6 g.

6—Synthesis of the CSP 9803/5301: Selector L(AOPC-DMPC) Crosslinked with DAT 0.82 g of selector from example 1 or L(AOPC-DMPC) is dissolved with 12 ml of tetrahydrofuran and 200 mg of (−)-N,N'-diallyl-L-tartramide or DAT. 4 g of 1000 Å (pore diameter), 5 µm (particle diameter) silica are suspended in the above solution.

100 ml of heptane and 0.05 g of AIBN (azobisisobutyronitrile) are added slowly over 1 hour. The suspension is filtered after being brought to reflux for 24 hours. The solid is washed with 100 ml of ethanol and then dried at 50° C. Dry weight: 4.4 g.

7—Synthesis of the CSP 9803/5901: Selector L(AOPC-DMPC) Crosslinked with DBBDAT 0.82 g of selector from example 1 or L(AOPC-DMPC) is dissolved with 12 ml of tetrahydrofuran and 200 mg of (−)-O—O-di-tert-butylbenzoyl-N,N'-diallyl-L-tartramide or DBBDAT. 4 g of 1000 Å (pore diameter), 5 µm (particle diameter) silica are suspended in the above solution.

100 ml of heptane and 0.05 g of AIBN (azobisisobutyronitrile) are added slowly over 1 hour. The suspension is filtered after having been brought to reflux for 24 hours. The solid is washed with 100 ml of ethanol and then dried at 50° C. Dry weight: 4.5 g.

8—Synthesis of the CSP 9803/5701: Selector L(AOPC-DMPC) Crosslinked with T(AOPC-DMPC)

0.82 g of selector from example 1 or L(AOPC-DMPC) is dissolved with 12 ml of tetrahydrofuran and 1.41 mg of T(AOPC-DMPC) from example 3.4 g of 1000 Å (pore diameter), 5 µm (particle diameter) silica are suspended in the above solution.

100 ml of heptane and 0.05 g of AIBN (azobisisobutyronitrile) are added slowly over 1 hour. The suspension is filtered after having been brought to reflux for 24 hours. The solid is washed with 100 ml of ethanol and then dried at 50° C. Dry weight: 4.95 g.

9—Synthesis of the CSP 9803/5801: Selector L(AOPC-DMPC) Crosslinked with T(AOPC-DMPC) and EDT (Nonchiral)

0.82 g of selector from example 1 or L(AOPC-DMPC) are dissolved with 12 ml of tetrahydrofuran, 0.25 g of ethanedithiol or EDT and 1.41 g of T(AOPC-DMPC) from example 3.4 g of 1000 Å (pore diameter), 5 μm (particle diameter) silica are suspended in the above solution.

100 ml of heptane and 0.05 g of AIBN (azobisisobutyronitrile) are added slowly over 1 hour. The suspension is filtered after having been brought to reflux for 24 hours. The solid is washed with 100 ml of ethanol and then dried at 50° C. Dry weight: 5.12 g.

10—Synthesis of the CSP 9803/6001: Selector L(AOPC-DMPC) Crosslinked with DADAT 0.82 g of selector from example 1 or L(AOPC-DMPC) are dissolved with 12 ml of tetrahydrofuran and 102 mg of (−)-O,O'-diacetyl-N,N'-diallyl-L-tartramide, or DADAT. 4 g of 1000 Å (pore diameter), 5 μm (particle diameter) silica are suspended in the above solution.

100 ml of heptane and 0.05 g of AIBN (azobisisobutyronitrile) are added slowly over 1 hour. The suspension is filtered after having been brought to reflux for 24 hours. The solid is washed with 100 ml of ethanol and then dried at 50° C. Dry weight: 4.55 g.

11—Synthesis of the CSP 9803/6001: Selector T(AOPC-DMPC) Crosslinked with DAT 0.82 g of selector from example 3 or T(AOPC-DMPC) are dissolved with 12 ml of tetrahydrofuran and 105 mg of (−)-N,N'-diallyl-L-tartramide or DAT. 0.4 g of 1000 Å (pore diameter), 5 μm (particle diameter) silica are suspended in the above solution.

100 ml of heptane and 0.05 g of AIBN (azobisisobutyronitrile) are added slowly over 1 hour. The suspension is filtered after having been brought to reflux for 24 hours. The solid is washed with 100 ml of ethanol and then dried at 50° C. Dry weight: 4.85 g.

12—Synthesis of the CSP 0002/1001: Selector L(AOPC) Crosslinked with DAT (6/1)*

0.60 g of selector from example 2 or L(AOPC) are dissolved with 12 ml of tetrahydrofuran and 50 mg of (−)—N,N'-diallyl-L-tartramide or DAT, which corresponds to 1 mole of DAT used per 1 cellobiose unit from example 2 (6 terminal double bonds), hence the 6/1 ratio.

4 g of 1000 Å (pore diameter), 5 μm (particle size) silica are suspended in the above solution.

100 ml of heptane and 0.05 g of AIBN (azobisisobutyronitrile) are added slowly over 1 hour. The suspension is filtered after having been brought to reflux for 24 hours. The solid is washed with 100 ml of ethanol and then dried at 50° C. Dry weight: 4.51 g.

13—Synthesis of the CSP 0002/0801: Selector L(AOPC) Crosslinked with DAT (6/2)

0.60 g of selector from example 2 or L(AOPC) are dissolved with 12 ml of tetrahydrofuran and 100 mg of (−)-N,N'-diallyl-L-tartramide or DAT, which corresponds to 1 mole of DAT used per 2 cellobiose units from example 2 (6 terminal double bonds), hence the 6/2 ratio.

4 g of 1000 Å (pore diameter), 5 μm (particle size) silica are suspended in the above solution.

100 ml of heptane and 0.05 g of AIBN (azobisisobutyronitrile) are added slowly over 1 hour. The suspension is filtered after having been brought to reflux for 24 hours. The solid is washed with 100 ml of ethanol and then dried at 50° C. Dry weight: 4.58 g.

14—Synthesis of the CSP 0002/0901: Selector L(AOPC) Crosslinked with DAT (6/6)

0.60 g of selector from example 2 or L(AOPC) are dissolved with 12 ml of tetrahydrofuran and 300 mg of (−)-N,N'-diallyl-L-tartramide or DAT, which corresponds to 1 mole of DAT used per 6 cellobiose units from example 0.2 (6 terminal double bonds), hence the 6/6 ratio.

4 g of 1000 Å (pore diameter), 5 μm (particle size) silica are suspended in the above solution.

100 ml of heptane and 0.05 g of AIBN (azobisisobutyronitrile) are added slowly over 1 hour. The suspension is filtered after having been brought to reflux for 24 hours. The solid is washed with 100 ml of ethanol and then dried at 50° C. Dry weight: 4.48 g.

15—Synthesis of the CSP 0002/1101: Selector L(AOPC) Crosslinked with DAT and DDT 0.60 g of the selector from example 2 or L(AOPC) are dissolved with 12 ml of tetrahydrofuran, 300 mg of (−)—N,N'-diallyl-L-tartramide or DAT, and 404 mg of (R,R)-1,4-dithiothreitol or DDT. 3 ml of pyridine are also added. 4 g of 1000 Å (pore diameter), 5 μm (particle diameter) silica are suspended in the above solution.

100 ml of heptane and 0.05 g of AIBN (azobisisobutyronitrile) are added slowly over 1 hour. The suspension is filtered after having been brought to reflux for 24 hours. The solid is washed with 100 ml of ethanol and then dried at 50° C. Dry weight: 4.40 g.

16—Procedure for Filling Columns with the Various Synthesized CSPs 4 to 4.5 g of one of the CSPs prepared in the preceding examples are suspended in 30 ml of ethanol and are subjected to a pressure of 500 bar of ethanol by percolation (column filling device) in a 250×4.6 mm stainless steel HPLC column.

17—Enantioselective Test Procedure

The various columns containing the CSPs are conditioned with the eluant used, for 1 hour, before injection of the racemic product to be separated.

The chromatographic conditions are as follows:

mobile phase flow rate: 1 ml/mn;

UV detection at 254 nm;

optical density scale: 0.1;

injection of a solution comprising 1 mg of the racemic product to be separated given below in 1 ml of eluant also given below.

| Racemic product to be separated | Eluant |
|---|---|
| TSO or trans-stilbene oxide | 90/10 heptane/isopropanol |
| Flavanone | 90/10 heptane/isopropanol |
| Benzoin | 90/10 heptane/isopropanol |
| Binaphthol | 100% diisopropyl ether |
| α-methoxyphenylacetic acid | 99/1 diisopropyl ether/trifluoroacetic acid |
| TRAE or 2,2,2-trifluoro-1-(9-anthryl) ethanol | 100% chloroform |

The results of the rounds of chromatography are given in tables 1 and 2 below.

For each measurement, the retention times t of each of the recovered enantiomers, and also the capacity factor $k'_2$ and the selectivity factor α, are indicated.

TABLE 1

CROSSLINKING WITH HOMOCHIRAL AGENTS

| SELECTORS | | | CSP | TSO | | | Flavanone | | | Benzoin | | |
|---|---|---|---|---|---|---|---|---|---|---|---|---|
| 1 | 2 | 3 | No | $t_2$ | $k'_2$ | α | $t_2$ | $k'_2$ | α | $t_2$ | $k'_2$ | α |
| L(AOPC-DMPC) | Ø | DDT | 9803/5601 | 4.30 | 0.43 | 1.36 | 5.40 | 0.80 | 1.23 | 7.08 | 1.36 | 1.34 |
| L(AOPC-DMPC) | Ø | DAT | 9803/5301 | 4.78 | 0.59 | 1.61 | 6.44 | 1.15 | 1.31 | 9.57 | 2.19 | 1.41 |
| L(AOPC-DMPC) | Ø | DBBDAT | 9803/5901 | 6.22 | 1.08 | 1.95 | 8.07 | 1.69 | 1.39 | 13.24 | 3.41 | 1.49 |
| L(AOPC-DMPC) | Ø | T(AOPC-DMPC) | 9803/5701 | 6.97 | 1.32 | 1.86 | 9.35 | 2.12 | 1.33 | 15.67 | 4.22 | 1.48 |
| L(AOPC-DMPC) | EDT | T(AOPC-DMPC) | 9803/5801 | 6.79 | 1.34 | 1.19 | 18.37 | 5.33 | 1.59 | 18.67 | 5.44 | 1.20 |
| L(AOPC-DMPC) | Ø | DADAT | 9803/6001 | 5.68 | 1.03 | 1.71 | 7.41 | 1.65 | 1.35 | 11.90 | 3.25 | 1.43 |
| T(AOPC-DMPC) | EDT | DAT | 0005/0601 | 5.19 | 0.79 | 1.17 | 12.19 | 3.20 | 1.42 | 14.53 | 4.01 | 1.00 |

| SELECTORS | | | CSP | Binaphthol | | | α-methoxy-phenylacetic acid | | | TFAE | | |
|---|---|---|---|---|---|---|---|---|---|---|---|---|
| 1 | 2 | 3 | No | $t_2$ | $k'_2$ | α | $t_2$ | $k'_2$ | α | $t_2$ | $k'_2$ | α |
| L(AOPC-DMPC) | Ø | DDT | 9803/5601 | 8.22 | 1.73 | 1.99 | 5.58 | 0.86 | 1.48 | 4.57 | 0.52 | 1.66 |
| L(AOPC-DMPC) | Ø | DAT | 9803/5301 | 15.33 | 4.11 | 2.36 | 7.63 | 1.54 | 1.54 | 5.13 | 0.83 | 2.03 |
| L(AOPC-DMPC) | Ø | DBBDAT | 9803/5901 | 22.83 | 6.61 | 1.79 | 12.44 | 3.14 | 1.37 | — | | |
| L(AOPC-DMPC) | Ø | T(AOPC-DMPC) | 9803/5701 | 23.88 | 6.96 | 1.97 | 13.74 | 3.58 | 1.36 | — | | |
| L(AOPC-DMPC) | EDT | T(AOPC-DMPC) | 9803/5801 | 25.25 | 7.41 | 1.44 | 15.98 | 4.32 | 1.13 | 7.72 | 1.76 | 1.93 |

EDT: Ethanedithiol
DDT: (R,R)-dithiothreitol
DAT: N,N'-diallyltartramide
DBBDAT: Di-tert-butylbenzoyldiallyltartramide
DADAT: Diacetyldiallyltartramide (T(AOPC-DMPC): tetrakis-6-O-(4-allyloxyphenylcarbamate)tris-6-O-(3,5-dimethylphenyl-carbamate)heptakis-2,3-O-di-(3,5-dimethylphenylcarbamate)-β-cyclodextrin
L(AOPC-DMPC): cellulose [6-(4-allyloxyphenyl)urethane,tris-2,3,6-(3,5-dimethylphenyl)urethane]

TABLE 2

CROSSLINKING WITH HOMOCHIRAL AGENTS

| SELECTORS | | | CSP | TSO | | | Flavanone | | | Benzoin | | | |
|---|---|---|---|---|---|---|---|---|---|---|---|---|---|
| 1 | 2 | Proportion | No | $t_2$ | $k'_2$ | α | $t_2$ | $k'_2$ | α | $t_2$ | $k'_2$ | α | RS |
| L(AOPC) | DAT | 6/1 | 0002/1001 | 8.60 | 2.44 | 1.19 | 12.49 | 4.00 | 1.08 | 17.18 | 5.87 | 1.03 | 0.59 |
| L(AOPC) | DAT | 6/2 | 0002/0801 | 8.92 | 2.57 | 1.15 | 12.82 | 4.13 | 1.07 | 17.33 | 5.93 | 1.03 | 0.63 |
| L(AOPC) | DAT | 6/6 | 0002/0901 | 8.07 | 2.23 | 1.12 | 11.98 | 3.79 | 1.06 | 16.92 | 5.77 | 1.04 | 0.99 |
| L(AOPC) | DAT/DDT | 6/6 | 0002/1101 | 4.77 | 0.70 | 1.33 | 7.28 | 1.60 | 1.10 | 11.03 | 2.94 | 1.00 | 0 |

The invention claimed is:

1. A crosslinked optically active three-dimensional polymer network consisting of homochiral units of a first selector and of homochiral units of at least one second selector of a structure different from the first selector,
the homochiral units of the first selector containing at least three polymerizable or crosslinkable functional groups and the homochiral units of the second selector containing at least two polymerizable or crosslinkable functional groups,
the homochiral units being chemically linked to one another,
with the exclusion of the crosslinked three-dimensional polymer networks obtained either by reductive amination of chitosan and 2,3-dialdehydo-β-cyclodextrin, or by reaction between chitosan and chlorotriazinyl-β-cyclodextrin, or by crosslinking of a polysaccharide and a protein, or by reductive amination of a first polysaccharide, in which the saccharide rings have been opened using an oxidizing agent so as to form aldehyde functions, with a second polysaccharide carrying at least two amine functions, said first and second polysaccharides being chosen from hyaluronic acid, dextran, dextran sulfate, keratan sulfate, heparin, heparin sulfate and alginic acid.

2. The polymer network as claimed in claim 1 wherein a nonchiral crosslinking agent containing at least two polymerizable or crosslinkable functional groups is attached to at least some of the homochiral units of a selector chosen from the group comprising the first selector, the second selector and, optionally, the third selector.

3. The polymer network according to claim 2 wherein the nonchiral crosslinking agent containing at least two polymerizable or crosslinkable functional groups is chosen from the group comprising ethanedithiol, trithiocyanuric acid, 1,6-hexanedithiol, 1,2,6-hexanetrioltrithioglycolate and 2,5-dimercapto-1,3,4-thiadiazole.

4. The polymer network according to claim 1 wherein the homochiral units of a selector chosen from the group comprising the first selector, the second selector and, optionally, the third selector are chosen from the group consisting of (R,R)-dithiothreitol (DTT), tartaric acid or derivatives thereof, or derivatives thereof, cellulose or derivatives thereof, and chitosan or derivatives thereof.

5. The polymer network according to claim 4, wherein said cyclodextrin or derivatives thereof is β-cyclodextrin or derivatives thereof.

6. The polymer network according to claims 1, in which the homochiral units of at least one of the selectors are not β-cyclodextrin derivatives.

7. A method for preparing a polymer network according to claim 1 wherein:
   a) at least one first selector consisting of at least one homochiral unit containing at least three polymerizable or crosslinkable functional groups, at least one second selector consisting of at least one homochiral unit containing at least two polymerizable or crosslinkable functional groups and, optionally, at least one third selector consisting of at least one homochiral unit containing at least two polymerizable or crosslinkable functional groups are selected;
   b) optionally, at least one nonchiral crosslinking agent containing at least two polymerizable or crosslinkable functional groups is selected;
   c) optionally, at least some of the homochiral units of the first selector and/or of the second selector and/or, optionally, of the third selector are reacted with the nonchiral crosslinking agent;
   d) either the homochiral units of the first selector are copolymerized with the homochiral units of the second selector and, optionally, with the homochiral units of the third selector;
   e) or else at least some of the homochiral units containing at least three polymerizable or crosslinkable functional groups of the first selector are homopolymerized, and the homopolymerisates obtained are crosslinked with the homochiral units containing at least two polymerizable or crosslinkable functional groups of the second selector and, optionally, of the third selector, optionally in the presence of the remaining homochiral units of the first selector.

8. An optically active support material containing a polymer network prepared according to the method of claim 7, and an inert, mineral or organic support, said support preferably being in the form of solid particles.

9. The support material according to claim 8, consisting of at least 0.1% by weight of the polymer network.

10. Method for the purification of a mixture of at least two constituents, chosen from the group comprising organic, mineral or organomineral molecules, wherein the various constituents are brought into contact with a polymer network prepared according to claim 7 and at least part of one of these constituents is removed.

11. Method for removing from a mixture of at least two enantiomers, chosen from the group comprising chiral organic molecules or chiral organomineral molecules, at least part of one of these constituents, wherein the mixture is brought into contact with the polymer network prepared according to claim 7 in order to form a polymer network/absorbed enantiomer complex, said complex is then filtered and destroyed with a solvent for said enantiomer, so as to enrich the mixture in one of the optically active homochiral molecules and to thus obtain one of the enantiomers enriched.

12. Method for separating optically active molecules by chromatographic method, wherein the stationary phase is the polymer network prepared according to claim 7.

13. An optically active support material containing a polymer network according to claim 1 and an inert, mineral or organic support, said support preferably being in the form of solid particles.

14. The support material according to claim 13, consisting of at least 0.1% by weight of the polymer network.

15. The support material according to claim 13 wherein the polymer network is chemically linked to the support or is deposited onto the support.

16. The support material according to claim 13, wherein the polymer network is chemically linked to the support or is deposited onto the support.

17. Method for the purification of a mixture of at least two constituents, chosen from the group comprising organic, mineral or organomineral molecules, wherein the various constituents are brought into contact with a polymer network according to claim I and at least part of one of these constituents is removed.

18. Method for removing from a mixture of at least two enantiomers, chosen from the group comprising chiral organic molecules or chiral organomineral molecules, at least part of one of these constituents, wherein the mixture is brought into contact with the polymer network according to claim 1 in order to form a polymer network/absorbed enantiomer complex, said complex is then filtered and destroyed with a solvent for said enantiomer, so as to enrich the mixture in one of the optically active homochiral molecules and to thus obtain one of the enantiomers enriched.

19. Method for separating optically active molecules by chromatographic method, wherein the stationary phase is the polymer network according to claim 1.

20. The polymer network according to claim 1 wherein the homochiral units of a selector chosen from the group comprising the first selector, the second selector and, optionally, the third selector are chosen from the group consisting of
   (R,R)-dithiothreitol (DTT);
   tartaric acid or derivatives thereof selected from the group consisting of N,N'-diallyltartramide (DAT), di-tert-butylbenzoyldiallyltartramide (DBBDAT) and diacetyldiallyltartramide (DADAT);
   cyclodextrin or a derivative thereof consisting of tetrakis-6-O-(4-allyloxyphenylcarbamate)tris-6-O-(3,5-dimethylphenylcarbamate)heptakis-2,3-O-di-(3,5-dimethylphenylcarbamate)-β-cyclodextrin (T (AOPC-DMPC));
   cellulose or derivatives thereof selected from the group consisting of cellulose [6-(4-allyloxyphenyl)urethane and tris-2,3,6-[3,5-dimethylphenyl)urethane](L (AOPC-DMPC)); and
   chitosan or derivatives thereof.

21. A crosslinked optically active three-dimensional polymer network consisting of homochiral units of a first selector and of homochiral units of a second selector of structure different from the first selector and of homochiral units of a third selector of structure different from the first and from the second selector, the homochiral units of the first selector containing at least three polymerizable or crosslinkable functional groups and the homochiral units of the second selector and also the homochiral units of the third selector containing at least two polymerizable or crosslinkable functional groups, the homochiral units being chemically linked to one another.

* * * * *

UNITED STATES PATENT AND TRADEMARK OFFICE
CERTIFICATE OF CORRECTION

| | | |
|---|---|---|
| PATENT NO. | : 7,576,034 B2 | Page 1 of 1 |
| APPLICATION NO. | : 10/490356 | |
| DATED | : August 18, 2009 | |
| INVENTOR(S) | : Raphael Duval et al. | |

It is certified that error appears in the above-identified patent and that said Letters Patent is hereby corrected as shown below:

Claim 4, column 14, line 60

"thereof, or derivatives thereof, cellulose or derivatives"    should read

-- thereof, cyclodextrin or derivatives thereof, cellulose or derivatives --

Claim 6, column 14, line 65

"according to claims 1,"    should read

-- according to claim 1, --

Claim 19, column 16, line 27

"polymer network according to claim 1"    should read

-- polymer network prepared according to claim 1 --

Signed and Sealed this
Eighth Day of March, 2011

David J. Kappos
*Director of the United States Patent and Trademark Office*